(12) United States Patent
Kusunoki (10) Patent No.: US 10,555,308 B2
(45) Date of Patent: Feb. 4, 2020

(54) DEVICE AND METHOD FOR PERFORMING NON-ORTHOGONAL MULTIPLEXING

(71) Applicants: SONY CORPORATION, Tokyo (JP); SONY MOBILE COMMUNICATIONS INC., Tokyo (JP)

(72) Inventor: Shigeo Kusunoki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 8 days.

(21) Appl. No.: 15/935,298

(22) Filed: Mar. 26, 2018

(65) Prior Publication Data

US 2018/0213535 A1 Jul. 26, 2018

Related U.S. Application Data

(63) Continuation of application No. 14/821,358, filed on Aug. 7, 2015, now Pat. No. 9,930,671.

(60) Provisional application No. 62/052,291, filed on Sep. 18, 2014, provisional application No. 62/040,671, filed on Aug. 22, 2014.

(51) Int. Cl.
| | |
|---|---|
| *H04W 72/04* | (2009.01) |
| *H04B 7/06* | (2006.01) |
| *H04J 11/00* | (2006.01) |
| *H04B 7/0456* | (2017.01) |
| *H04B 1/707* | (2011.01) |
| *H04J 13/00* | (2011.01) |

(52) U.S. Cl.
CPC ........ *H04W 72/0466* (2013.01); *H04B 1/707* (2013.01); *H04B 7/0456* (2013.01); *H04B 7/0678* (2013.01); *H04J 11/00* (2013.01); *H04J 13/0048* (2013.01)

(58) Field of Classification Search
CPC .... H04B 1/707; H04B 7/0456; H04B 7/0473; H04B 7/0678; H04L 5/0048; H04L 5/0051; H04W 72/042; H04W 72/0466; H04J 11/00
USPC ......... 370/208, 209, 329, 330; 375/144, 267
See application file for complete search history.

(56) References Cited

U.S. PATENT DOCUMENTS

| | | | |
|---|---|---|---|
| 5,652,764 A | 7/1997 | Kanzaki | |
| 2002/0018454 A1 | 2/2002 | Misra et al. | |
| 2005/0281214 A1 | 12/2005 | Misra et al. | |
| 2007/0286238 A1 | 12/2007 | Wang et al. | |
| 2008/0089354 A1 | 4/2008 | Yoon et al. | |
| 2011/0228735 A1* | 9/2011 | Lee ...................... H04L 5/0051 370/329 |

(Continued)

FOREIGN PATENT DOCUMENTS

| | | |
|---|---|---|
| CN | 101536572 A | 9/2009 |
| CN | 101558611 A | 10/2009 |

OTHER PUBLICATIONS

Extended European Search Report dated May 11, 2018 in Patent Application No. 18162037.8.

(Continued)

*Primary Examiner* — Harun Chowdhury
(74) *Attorney, Agent, or Firm* — Xsensus LLP (57) ABSTRACT

A device includes circuitry configured to spread one or more symbols with one or more orthogonal codes into spread signals having a predetermined number of bits. The amplitude of the spread signals is modified via one or more layer coefficients and the spread signals are multiplexed into a layered transmit signal.

20 Claims, 10 Drawing Sheets

(56) References Cited

U.S. PATENT DOCUMENTS

| | | |
|---|---|---|
| 2012/0195285 A1 | 8/2012 | Ko |
| 2013/0083826 A1* | 4/2013 | Zhu .................. H04B 7/0473 |
| | | 375/144 |
| 2013/0215842 A1 | 8/2013 | Han |
| 2014/0086351 A1* | 3/2014 | Nammi ............. H04B 7/0456 |
| | | 375/267 |
| 2014/0161157 A1 | 6/2014 | Balraj |
| 2015/0156050 A1 | 6/2015 | Nishimoto |

OTHER PUBLICATIONS

Marzetta, T.L., "Noncooperative Cellular Wireless with Unlimited Numbers of Base Station Antennas", IEEE Transactions on Wireless Communications, vol. 9, No. 11, pp. 3590-3600, (Nov. 2010).

Rusek, F., et al., "Scaling up MIMO", IEEE Signal Processing Magazine, pp. 40-60, (Jan. 2013).

Extended Search Report dated Jan. 19, 2016 in European Patent Application No. 15181602.2.

Chinese Office Action dated Sep. 26, 2019, issued in corresponding Chinese Patent Application No. 201510518197.2.

\* cited by examiner

DEVICE AND METHOD FOR PERFORMING NON-ORTHOGONAL MULTIPLEXING

CROSS-REFERENCE TO RELATED PATENT APPLICATIONS

The present application is a continuation application which claims the benefit of priority under 35 U.S.C. § 120 of U.S. patent application Ser. No. 14/821,358, filed Aug. 7, 2015, which claims the benefit of the earlier filing date of U.S. provisional application 62/040,671 having common inventorship with the present application and filed in the U.S. Patent and Trademark Office on Aug. 22, 2014, the entire contents of which being incorporated herein by reference. In addition, the present application incorporates by reference the entire contents of and claims the benefit of the earlier filing date of U.S. provisional application 62/052,291 having common inventorship with the present application and filed in the U.S. Patent and Trademark Office on Sep. 18, 2014.

BACKGROUND

Technical Field

The present disclosure relates to communication using orthogonal frequency division multiplexing (OFDM) for communications, and more particularly, to a multiplexing method.

Description of the Related Art

Recently, in addition to existing mobile phones, other wireless communication devices have been developed. It is estimated that by the year 2020, the demands on wireless communication resources will be one thousand times greater than the current wireless communication demands, which creates a need for new wireless communication resources, which can be limited by restrictions within existing wireless communication technologies. Within the 3GPP international standard for wireless communication, a fifth generation (5G) standard has been developed, which further increases frequency utilization efficiency in order to accommodate the increasing demands on wireless communication systems.

In the present LTE/LTE-A, orthogonal frequency-division multiplexing (OFDM) is employed, and multiplexing is performed using orthogonality in the frequency domain. Further, carrier aggregation is used to increase wireless capacity by broadening bandwidth but does not solve the problem of radio wave resource depletion.

In some cases, the modulation order per subcarrier in OFDM is increased in order to increase a total number of multiplexed symbols. For example, LTE uses 16QAM (quadrature amplitude modulation) and LTE-A uses 256QAM. In the case of LTE-A, the total number of transmitted bits per subcarrier increases to eight, but the distance between symbols decreases so that a higher energy per bit to noise power spectral density ($E_b/N_0$) is required to maintain a predetermined physical layer bit error rate (PHY BER).

Other multiplexing methods have been introduced to solve the problems introduced by increasing the number of modulated bits per subcarrier that include employing orthogonality relationships between the modulated symbols that include frequency, time and code. For example, OFDM is associated with orthogonal frequencies, and CDMA is associated with orthogonal codes. In what is now considered to be fifth generation (5G) LTE, a filter bank multi carrier (FBMC) modulation method is used, which employs Wavelet OFDM. FBMC modulation makes a cycle prefix (CP) unnecessary by using time orthogonality and frequency orthogonality together. In addition, a guard band is also unnecessary because out-of-band radiation is very low. FBMC modulation allows a larger number of user equipments (UEs) to use identical bandwidths; however, the amount of improvement gained by eliminating the CP and guard band is at most ten percent, which is not enough to accommodate the increased demands on wireless communication systems.

In addition, non-orthogonal multiple access (NOMA) has also been considered for solving the problems resulting from increased demands on wireless communication systems. NOMA allows multiplexed signals to be separated at a receiver based on differences in signal-to-noise ratios (SNIRs) and allows transmitted signals to be multiplexed based on amplitude. For example, two signals can be multiplexed into a first layer and a second layer, and the transmitting power of the multiplexed signal is determined based on achieving a SNIR for the first layer and the second layer at the receiver that satisfies a desired BER. At the receiver, the multiplexed layers are sequentially recovered by subtracting a demodulated signal from the received signal. NOMA allows for greater amounts of multiplexing, but lower signal layers cause interference with the higher layers, which causes an overall increase in transmit power, which can cause difficulties for terminal devices with limited transmit powers. For example, two to three multiplexed layers are considered practical at this time.

In addition, NOMA uses a so-called adaptive modulation method to keep the transmitting power in a cell or terminal device constant. For example, adaptive modulation allows the amount of modulation to be changed based on the SNIR at the receiver. However, communication speeds can be very slow with adaptive modulation depending on the type of modulation being used, and frequency utilization efficiency can become even worse.

SUMMARY

In an exemplary embodiment, a device includes circuitry configured to spread one or more symbols with one or more orthogonal codes into spread signals having a predetermined number of bits. The amplitude of the spread signals is modified via one or more layer coefficients and the spread signals are multiplexed into a layered transmit signal.

In another exemplary embodiment, a method includes spreading one or more symbols with one or more orthogonal codes into spread signals having a predetermined number of bits; modifying an amplitude of the spread signals via one or more layer coefficients; multiplexing the spread signals into a layered transmit signal; and recovering received signal layers by reverse spreading a received signal with the one or more orthogonal codes.

In another exemplary a device includes circuitry configured to recover a highest received signal layer by reverse spreading a received signal with the one or more orthogonal codes, re-spread the highest received signal layer with one or more orthogonal codes and multiply a corresponding spread signal by an associated layer coefficient, and subtract a re-spread signal from the received signal to recover one or more lower received signal layers.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise. Furthermore, the terms "approximately," "approximate," "about," and similar terms generally refer to ranges that include the identified value within a margin of 20%, 10%, or 5%, and any values therebetween.

Aspects of the present disclosure are directed to a multiplexing method for increasing a number of multiplexed symbols for a modulated transmit signal while maintaining predetermined bit error rate criteria. The embodiments describe applying code multiplexing with an orthogonal code with non-orthogonal multiple access (NOMA) techniques to increase a total number of multiplexed symbols while simultaneously limiting an increase in transmit power and frequency utilization efficiency.

Figure 1A:
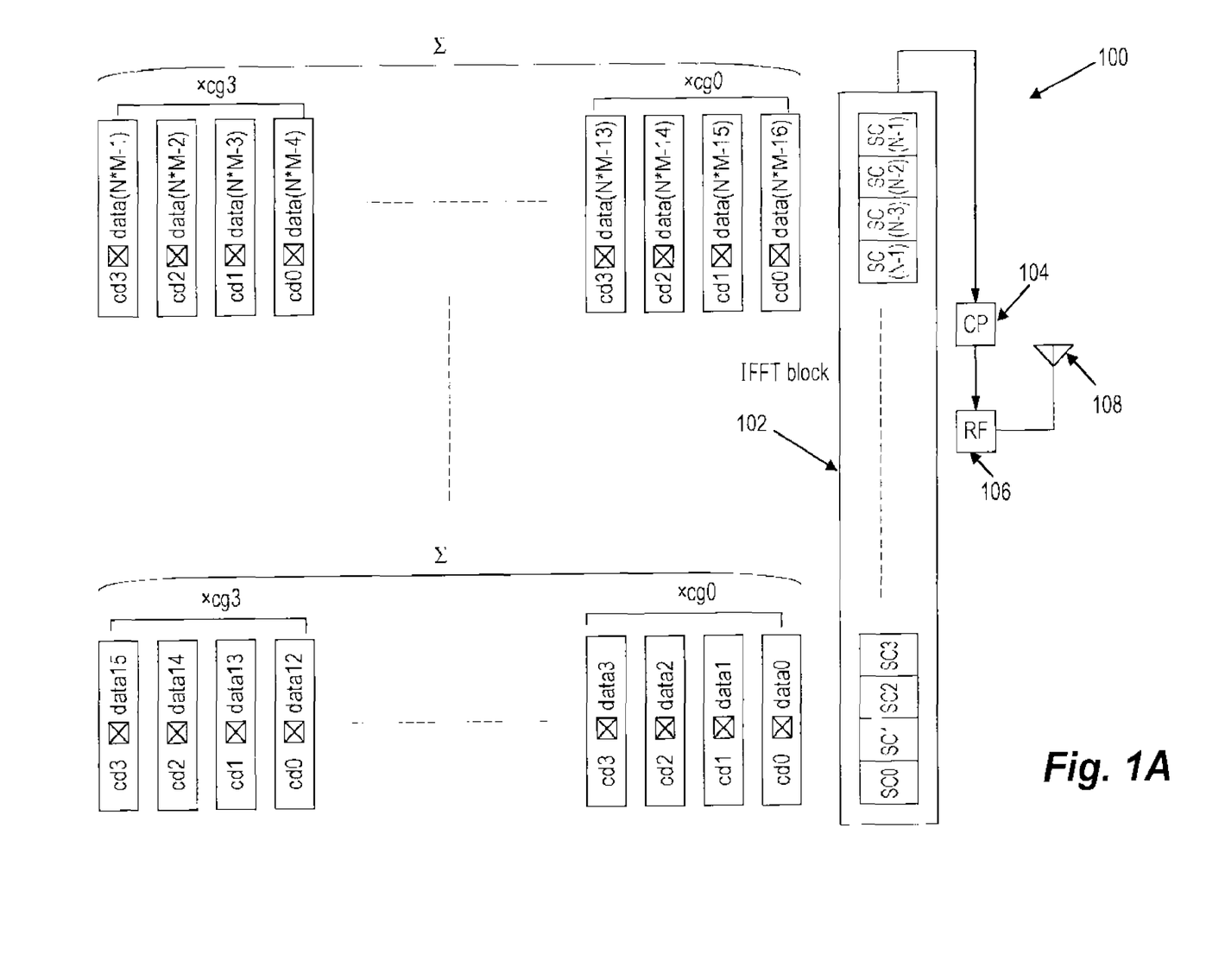
FIG. 1A is an exemplary block diagram of a transmitter, according to certain embodiments.

FIG. 1A is an exemplary block diagram of a transmitter 100, according to certain embodiments. The transmitter 100 includes an IFFT block 102 that computes the IFFT for a signal that includes one or more subcarriers. A cycle prefix (CP) is added to the signal at the CP module 104, and a radio-frequency (RF) front end 106 converts the signal into radio frequencies to be transmitted by an antenna 108.

FIG. 1A also shows a diagram of how the signal structure is constructed and transmitted by the transmitter 100. In some implementations, the transmitter 100 includes associated circuitry that is configured to convert a symbol into a spread signal having length $L_C$ bits by using an orthogonal code having a length of $L_C$ bits. As the symbol is spread via the orthogonal code, the amplitude of the spread symbols is equal to $1/L_C$ of the amplitude of the original symbol. In one implementation, the orthogonal code used to spread the symbol is a Walsh code. Since the orthogonal code with $L_C$ bits includes $L_C$ orthogonal codes cd0 to cd(Lc-1), multiplexing is performed by spreading each of the $L_C$ symbols via the $L_C$ orthogonal codes cd0 to cd($L_C$-1) and adding the resultant spread symbols together. The multiplexed symbols are then multiplied by a first layer coefficient cg0, which results in a first layer signal having $L_C$ symbols.

Next, a second layer signal is obtained by multiplexing a new symbol into spread symbols via the orthogonal code having $L_C$ bits, adding the resultant spread symbols together, and multiplying the spread symbols by a second layer coefficient cg1 to modify the amplitude of the symbols, which results in a second layer signal having $L_C$ symbols. The second layer signal is then multiplexed on to the first layer signal, and a total number of ($L_C \times M$) symbols are multiplexed by repeatedly performing the process of spreading, amplitude modification, and multiplexing onto previous layers up to an $M^{th}$ layer.

According to one implementation, each of the M layers is spread using the same orthogonal code and one or the M-layers may not be orthogonal with respect to the other layers. To be able to separate the M-layers at a receiver, the amplitudes of the layers are modified, which is referred to as Non-orthogonal Multiple Access (NOMA). In the present disclosure, the layer coefficients, cg0 to cg($L_C$-1), are used to modify the amplitude values of each other M layers. Details regarding the determination of the layer coefficients are discussed further herein.

Once the $1^{st}$ layer to $M^{th}$ layer signals have been multiplexed, the signals are allocated to subcarriers. Since each of the signals up to the $M^{th}$ layer have been spread over the $L_C$ bits, each of the $L_C$ bits are allocated to a corresponding subcarrier for OFDM, which results in ($L_C \times M$) symbols being multiplexed onto $L_C$ subcarriers. Additional M-layer signals are allocated to subcarriers until all subcarriers of the transmitter 100 have been allocated. In one implementation, a total number of subcarriers is represented by $N_{sub}$, and a total number of symbols that can be transmitted by one IFFT of the transmitter 100 is represented by the following equation:

$$\text{Total number of transmitted symbols} = \frac{N_{sub}}{L_C} \times M \times L_C \quad (1)$$

For example, the total number of transmitted symbols can be increased by increasing the number of layers of the layered transmit signal and/or increasing the number of subcarriers.

The total number of bits included in one symbol, $N_b$, that can be transmitted by one IFFT of the transmitter 100 can be represented as follows:

$$\text{Total number of transmitted bits} = N_b \times \frac{N_{sub}}{L_C} \times M \times L_C \quad (2)$$

Figure 1B:
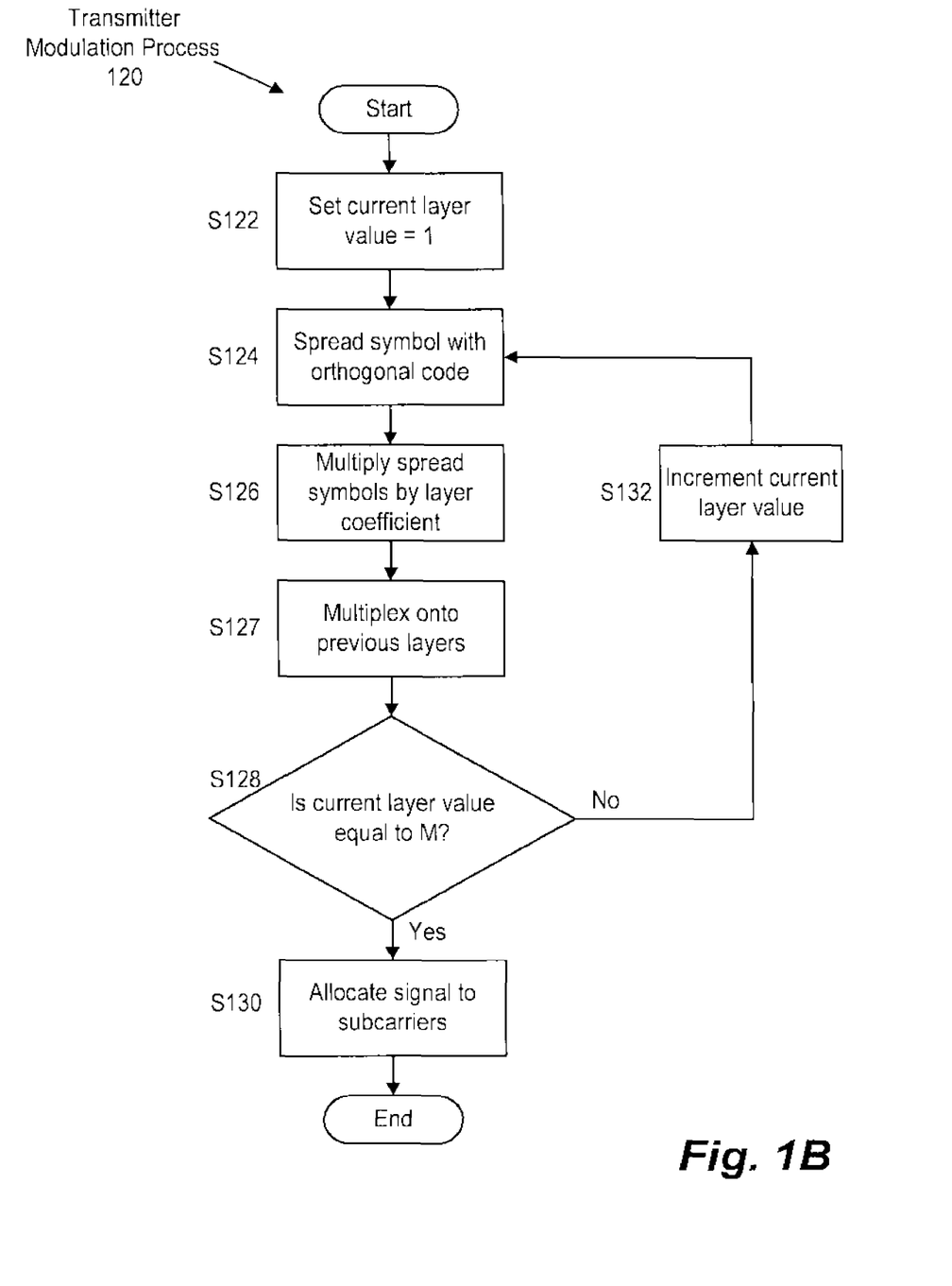
FIG. 1B is an exemplary flowchart of a transmitter modulation process, according to certain embodiments.

FIG. 1B is an exemplary flowchart of a transmitter modulation process 120, according to certain embodiments. In one example, the number of subcarriers $N_{sub}$ that can be handled by the IFFT block 102 of the transmitter 100 is equal to 2048. In addition, a total number of layers M associated with the symbols to be multiplexed is equal to 4.

At step S122, a current layer value is initialized to a value of one. At step S124, a symbol to be transmitted is spread using orthogonal codes of length $L_C$ bits. In one implementation, the orthogonal code that is used to modulate the transmitted symbols is a Walsh code having a length $L_C$ of 4 bits, and the orthogonal code can be described as follows:

$$cd0=(1,1,-1,-1) \quad (3.1)$$

$$cd1=(1,-1,-1,1) \quad (3.2)$$

$$cd2=(1,-1,1,-1) \quad (3.3)$$

$$cd3=(1,1,1,1) \quad (3.4)$$

Once the orthogonal code has been applied to the symbol, the resultant symbols are added together. For example, as shown in FIG. 1A, data0, data1, data2, and data3 represent the spread symbols that are multiplexed by orthogonal codes cd0, cd1, cd2, and cd3.

At step S126, the spread symbols are multiplied by a first layer coefficient cg0, which results in a first layer signal having $L_C$ symbols. In one implementation, the layer coefficients, cg0 to cg($L_C$-1), are used to modify the amplitude values of each other M layers. For example, because the layers are non-orthogonal with respect to one another, to separate the M-layers of transmitted signals at a receiver, each of the layers are multiplied by a value cg0 to cg($L_C$-1), which distinguishes the layers from one another. To reduce interference between the M layers, the values of cg for each of the layers are determined such that a highest layer coefficient is greater than a sum of one or more remaining lower layer coefficients with respect to the following equation:

$$cg(M-1) > cg(M-2) + \ldots + cg0 \quad (4)$$

For example, according to the example shown in FIG. 1A, the values of cg0 to cg3 are determined as follows:

$$cg0=1 \quad (5.1)$$

$$cg1=(1+dlt) \quad (5.2)$$

$$cg2=(1+dlt)*2 \quad (5.3)$$

$$cg3=(1+dlt)*4 \quad (5.4)$$

The coefficient cg0 corresponds to the coefficient applied to the first layer symbols, cg1 is applied to the second layer symbols, cg2 is applied to the third layer symbols, and cg3 is applied to the fourth layer symbols. An optimum value of a coefficient difference factor, dlt, is determined based on a bit error rate (BER). For example, interference between any two symbols can be reduced by increasing the value of the coefficient difference factor, dlt. In addition, the value of dlt is less than 1 (dlt<1).

The determination of the amplitude values of the symbols described by equations (5.1) to (5.4) can more generally be illustrated by an example of a downlink (DL) from a base station to a terminal. For example, a total number of multiplexed layers is equal to N is an integer and greater than two, and an amplitude of a first layer is referred to as S1, the amplitude of each of the layers up to an $N^{th}$ layer can be represented by the following equations:

$$\text{1st Layer:} S1=S1 \quad (6.1)$$

$$\text{2nd Layer:} S2=S1+dlt \quad (6.2)$$

$$\text{3rd to } N\text{th Layers } SM=2^{N-2}(S1+dlt) \quad (6.3)$$

Therefore, the amplitude of the signal resulting from the multiplexing of all of the layers can be represented by the following:

$$Sttl = \sum_{i=1}^{N} S_i \quad (7)$$

Thus, the equations (5.1) to (5.4) that describe layer coefficient values illustrate one exemplary implementation of equations (6.1) to (6.3) where S1 is equal to 1.

At step S127, the current layer is multiplexed onto the previous layers. For example, the second layer is multiplexed onto the first layer, the third layer is multiplexed onto the first two layers, and the fourth layer is multiplexed onto the first three layers. If the current layer is equal to one, then step S127 is skipped, and the process proceeds to step S128.

In one implementation, based on equation (7) and the relationships described above, a total amplitude resulting from all of the multiplexed layers is 8*(S1+dlt), which is approximately eight times larger than a signal amplitude that results when no multiplexing is performed. The increased amplitude means that the transmitting power used to transmit the layered, multiplexed signal also increases. According to some implementations, when compared to an implementation where multiplexing has not been performed, the transmitting power is increased by a factor of N when N multiplexing iterations are performed.

According to the embodiments described herein, the amplitude increase from the multiplexed layers may be mitigated due to the amplitude reduction that occurs when the signal is spread at step S122. For example, as the signals are spread to bits whose total number is $L_C$ times as many bits as the total number of signals being transmitted, each of the bits has an amplitude that is $1/L_C$ times as large as the amplitude of each of the signals. Therefore, equation (7) can be rewritten as follows:

$$Sttl \, CD = \frac{1}{L_C} \sum_{i=1}^{N} S_i \quad (8)$$

Because the amplitude of the signals is reduced by a factor of $1/L_C$ during the signal spreading at step S122, the overall amplitude of the transmitted signal is also reduced by a factor of $1/L_C$. Therefore, the transmitter circuitry can be configured to modify a total transmit power based on modifying at least one of a sum of the layer coefficients or the predetermined number of bits of the spread signal. The SNIR of the signal at a receiver is unaffected by the amplitude reduction because as reverse spreading is performed, one symbol is formed by accumulating the $L_C$ bits. For example, if spreading is performed using a code with a length of $L_C$=4, and it is determined based on equation (8) that the total transmission power is equal to 4, then no increase in transmission power resulted from multiplexing the signal layers together.

At step S128, it is determined whether the current layer value is equal to the total number of M layers. If the current layer value is not equal to M, resulting in a "no" at step S128, then step S132 is performed. At step S132, the current layer value is incremented by one, and the process returns to step S124 to repeat steps S124, S126, S127, and S128 for a subsequent layer. As shown in FIG. 1A, the process repeats until a fourth layer including data12, data13, data14, and data15 have been multiplexed onto the previous three layers by adding each of the bits of the spread signal from the fourth layer to the bits from the previous three layers. Otherwise, if the current layer value is equal to M, resulting in a "yes" at step S128, then step S130 is performed.

At step S130, the multi-layer multiplexed signal is allocated to one or more subcarriers. For example, the four bits that include data from the first to the fourth layers are allocated to the 0th to 3rd subcarriers, which results in sixteen symbols being multiplexed onto four subcarriers. The transmitter modulation process 120 is repeated for 512 (=2048/4) groups of subcarriers, which according to equation (1) results in 8192 symbols (=2048/4×4×4) being multiplexed for one inverse fast Fourier transform (IFFT) of the transmitter 100. In one implementation where quadrature phase-shift keying (QPSK) is performed on one symbol, the number of bits in one symbol, $N_b$, is equal to two. As a result, eight bits are multiplexed for each subcarrier, which is equal to the number of transmitting bits for 256 quadrature amplitude modulation-orthogonal frequency-division multiplexing (QAM-OFDM).

Figure 2A:
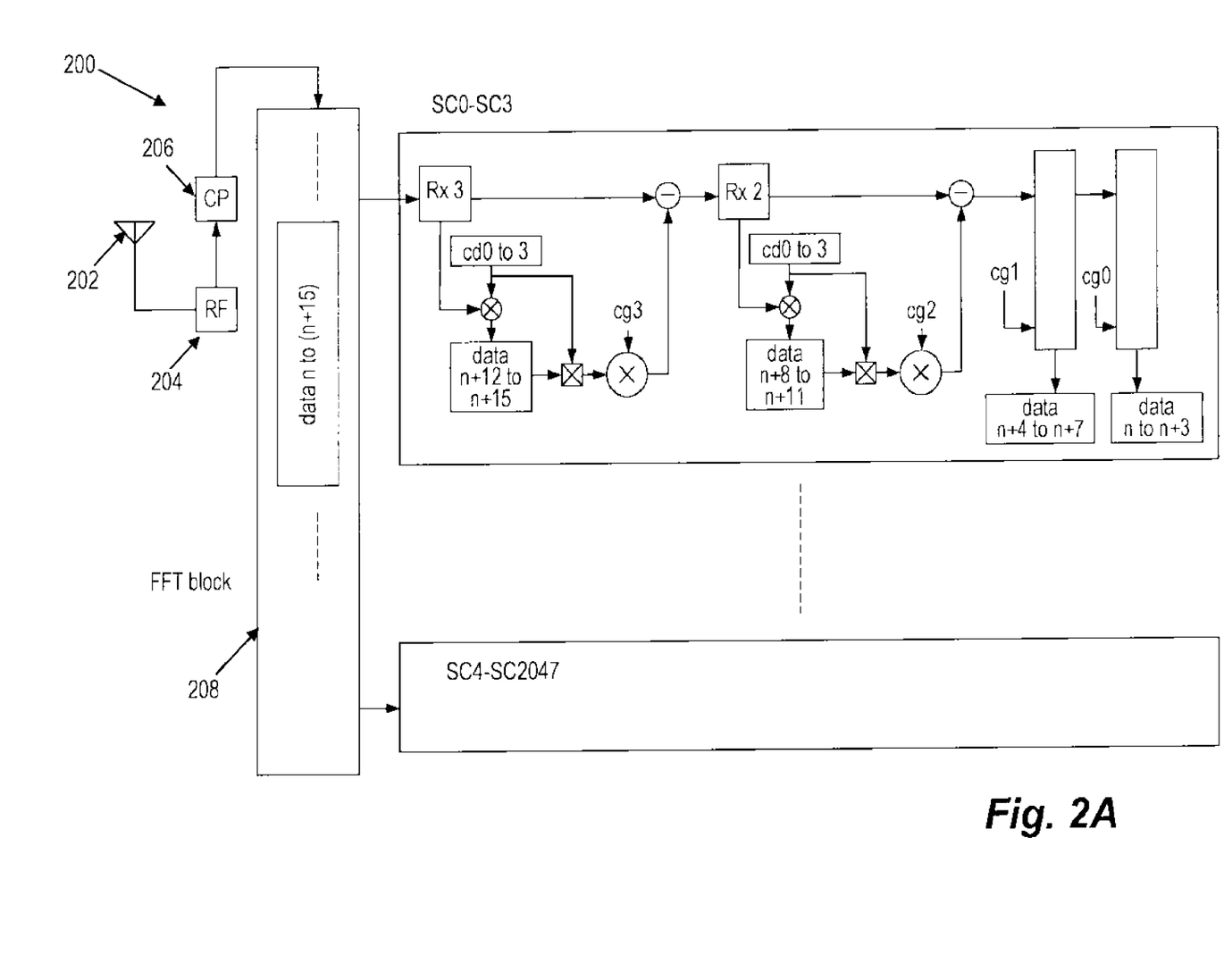
FIG. 2A is an exemplary block diagram of receiver, according to certain embodiments.

FIG. 2A is an exemplary block diagram of a receiver 200, according to certain embodiments. The receiver 200 includes an antenna 202 that receives signals, RF front end 204 that converts the incoming RF signal to baseband, and a CP removal module 206 that removes the CP from the incoming signal. The received signal is then returned to the frequency domain at fast Fourier transform (FFT) block 208. In one implementation, the resultant frequency domain signal is denoted by Rx M.

FIG. 2A also shows a diagram that illustrates how a layered, multiplexed signal is received and recovered by the receiver 100. In some implementations, the receiver 200 includes circuitry that is configured to perform a demodulation process that includes reverse spreading the received signal to recover the transmitted symbols. The reverse spreading is performed for each group of $L_C$ subcarriers using the orthogonal codes cd0 to cd($L_C$-1), which recovers $L_C$ received symbols from the $M^{th}$ layer. The received symbols are then spread again using the orthogonal codes cd0 to cd($L_C$-1), and the resultant spread signal is multiplied by coefficient cg M. After the multiplication, the resultant signal is subtracted from the original signal Rx M, and signal Rx (M-1) is obtained. Next, the reverse spreading process with the orthogonal codes cd0 to cd($L_C$-1) is again applied to the signal Rx (M-1), and another set of $L_C$ symbols are obtained for the (M-1)th layer. Subsequently, the demodulation process is repeated until the $1^{st}$ layer is reached, and all transmitted symbols are demodulated. The receiver 200 then repeats the demodulation process to recover the transmitted symbols allocated to each subcarrier.

Figure 2B:
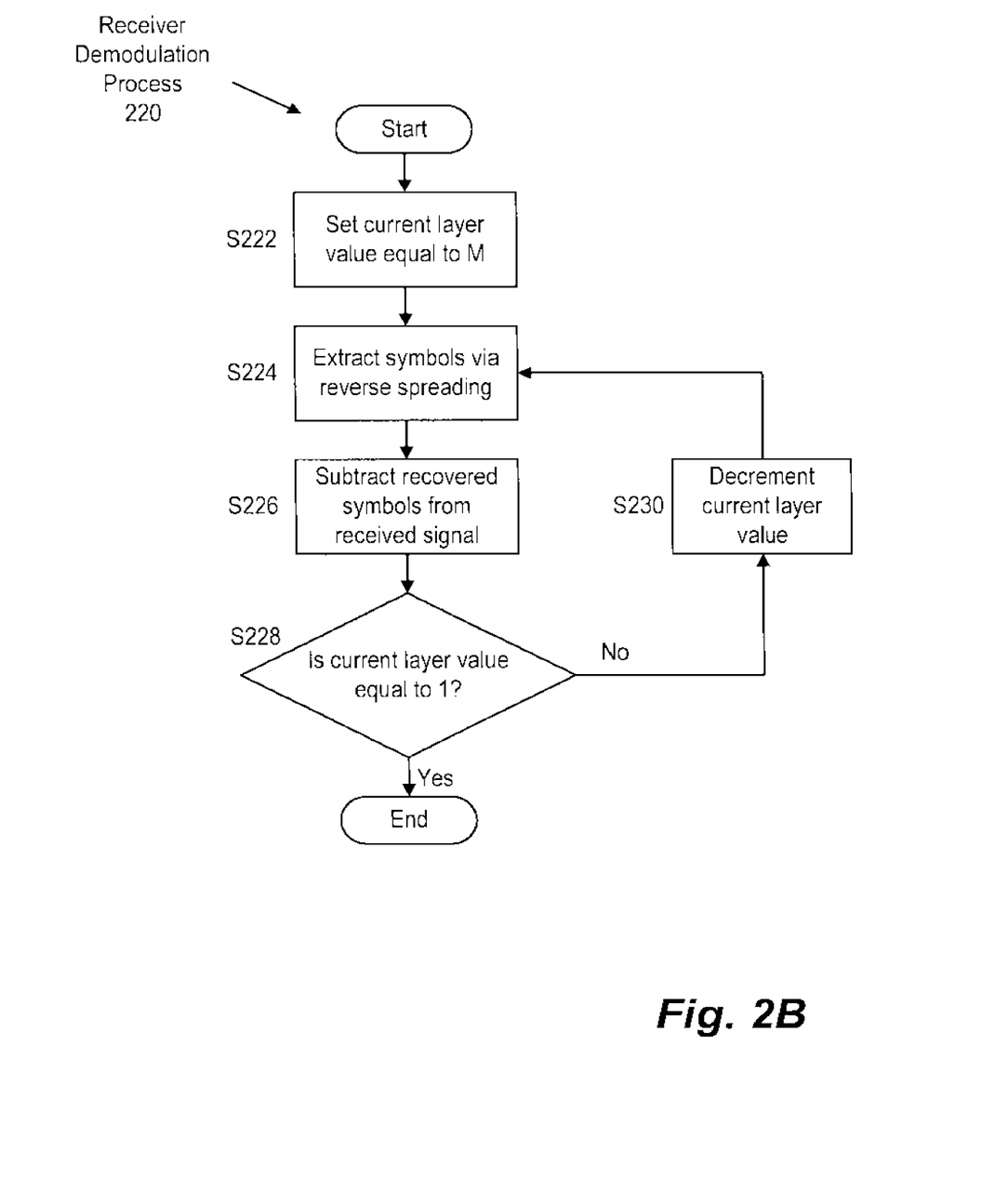
FIG. 2B is an exemplary flowchart of a receiver demodulation process, according to certain embodiments.

FIG. 2B is an exemplary flowchart of a receiver demodulation process 220, according to certain embodiments. In one example, the number of subcarriers $N_{sub}$ that can be handled by the FFT block 208 of the receiver 200 is equal to 2048. In addition, a total number of layers M associated with the symbols to be recovered is equal to 4.

At step S222 a current layer value is initialized to a value of M, which is 4 in one example. At step S224, a received signal Rx M associated with the first $L_C$ number of subcarriers SC0 to SC3 is reverse spread via the orthogonal codes cd0, cd1, cd2, and cd3 to recover the spread symbols associated with a highest layer of the transmit signal. As shown in FIG. 2A, data(n+12), data(n+13), data(n+14), and data(n+15) are recovered by performing the reverse spreading on the received signal Rx 4, which are the spread data signals that were allocated to the fourth, or highest, layer of the transmit signal.

At step S226, the recovered signals are re-spread using the orthogonal codes cd0, cd1, cd2, and cd3 and are multiplied by the coefficient cg3. As discussed previously, the received signal Rχ M includes signals that are spread over the $1^{st}$ to the $M^{th}$ layers by using the same orthogonal codes to spread the signals, which means that the layers are non-orthogonal with respect to one another. By modifying the amplitudes, each of the layers can be recovered at the receiver by applying the corresponding coefficients that were used at the transmitter 100. As discussed previously, when the $M^{th}$ layer is reverse spread, to reduce interference between the $M^{th}$ layer and the $1^{st}$ to (M-1)th layers, the layer coefficients are determined based on equation (4). The resultant highest received signal layer that is multiplied by cg3 is then subtracted from the Rx 4 signal to obtain the Rx 3 signal that includes the remaining lower signal layers. For example, the Rx 3 signal includes the spread signals associated with the first, second, and third layers.

At step S228, it is determined whether the current layer value is equal to one. If the current layer value is not equal to one, resulting in a "no" at step S228, then step S230 is performed. At step S230, the current layer value is decremented by one, and the process returns to step S224 to repeat steps S224, S226, and S228 in order to recover the received symbols associated with the next lowest layer. As shown in FIG. 2A, the process repeats until the transmitted symbols for the third, second, and first layers have been recovered. Otherwise, if the current layer value is equal to 1, resulting in a "yes" at step S228, then the process is terminated. The receiver demodulation process 400 is performed for all subcarriers to recover all of the transmitted data, which include the 512 groups of four subcarriers for the example described herein.

Figure 3A:
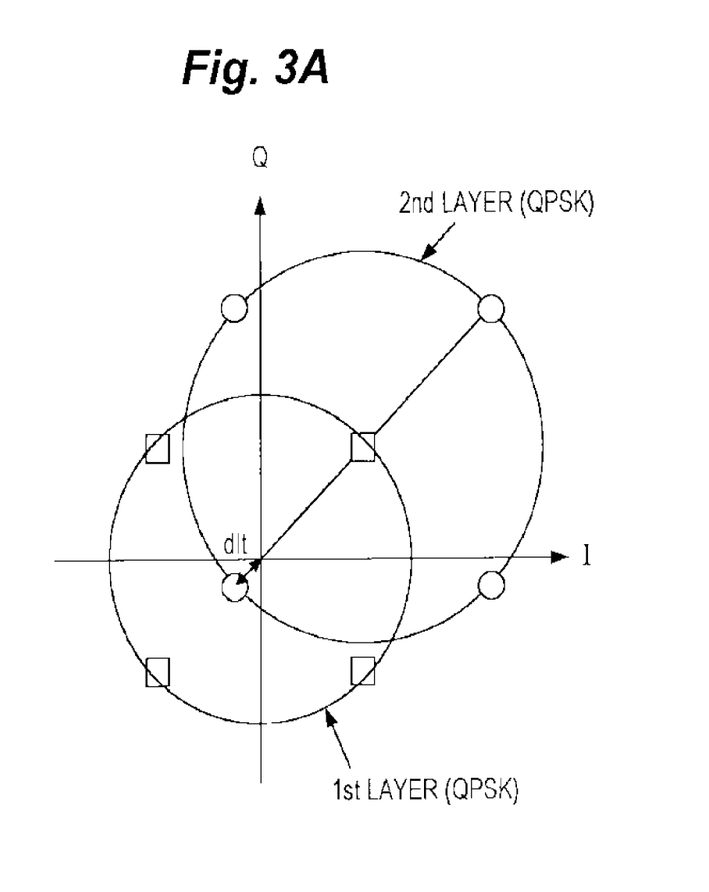
FIG. 3A is an exemplary diagram of multiplexed layers, according to certain embodiments.
Figure 3B:
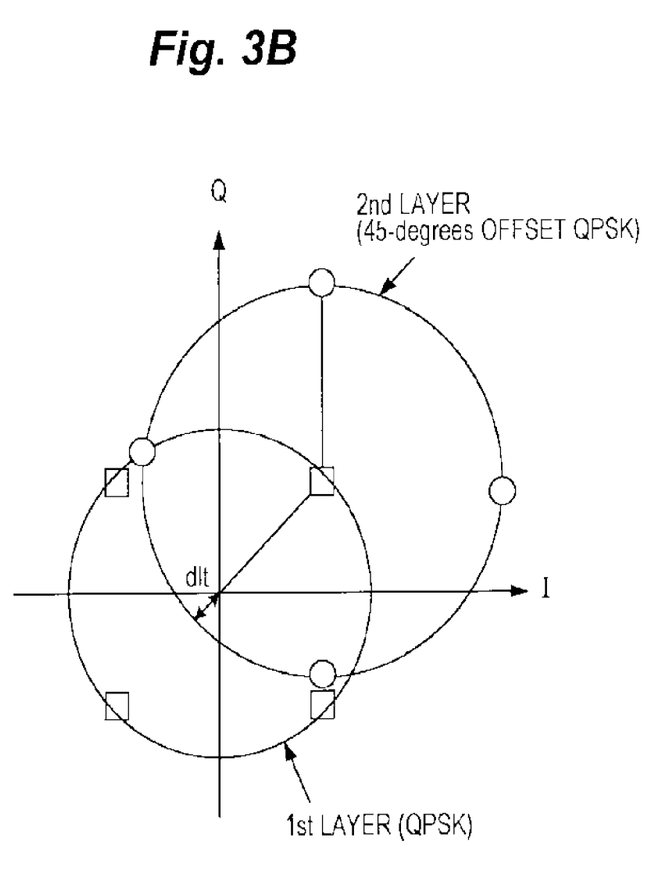
FIG. 3B is an exemplary diagram of multiplexed layers, according to certain embodiments.

FIGS. 3A and 3B are exemplary diagrams multiplexed layers resulting from the transmitter modulation process 120, according to certain embodiments. FIG. 3A illustrates an implementation where a first layer and a second layer employing QPSK that are multiplexed with the same phase. In FIG. 3B, the second layer is added to the first layer at an offset of 45 degrees. In some embodiments, the offset is added to every other layer of the multiplexed signal. For example, the fourth and sixth layers are also offset at 45 degrees. For the layers that have the offset applied, the layer coefficients cg are complex numbers, resulting in an overall amplitude reduction for the offset layers and reduced transmit power when compared to multiplexed signals that do not have the offset applied.

Figure 4A:
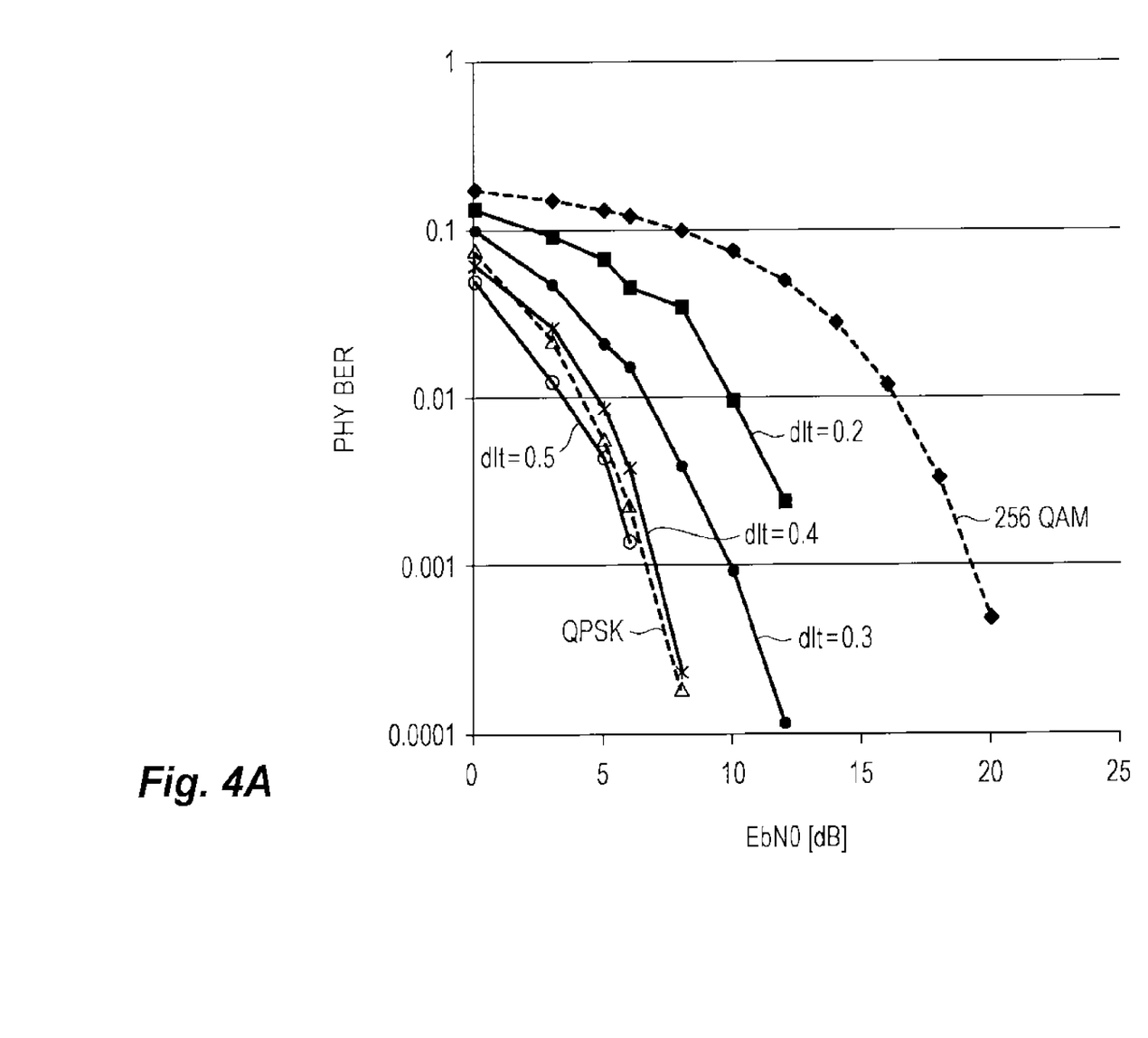
FIG. 4A is an exemplary graph of bit error rate of a physical layer, according to certain embodiments.

FIG. 4A is an exemplary graph of bit error rate BER of a physical layer (PHY BER), according to certain embodiments. The graph shows exemplary BER values for the transmitter 100 and receiver 200 described herein with respect to energy per bit to noise power spectral density ($E_b/N_0$) and includes theoretical values for QPSK and 256QAM systems. In addition, for BER curves shown in FIG. 4A, a Walsh code of length $L_C$=4 is used, and a total number of multiplexed layers is equal to four. In addition, OFDM with 2048 subcarriers is assumed, and all subcarriers are QPSK modulated, according to one implementation. BER curves are illustrated for cases where dlt is equal to 0.2, 0.3, 0.4, and 0.5, which show that the BER improves as the value of dlt increases. When dlt is equal to 0.4, the resulting BER is approximately equal to the BER for QPSK. The graph also includes a BER curve for a dlt of 0.5, which shows that the BER improvement for dlt values of greater than 0.4 is reduced due to saturation. Because the subcarriers are QPSK-modulated, the physical layer BER may not decrease to be less than the BER for QPSK.

Figure 4B:
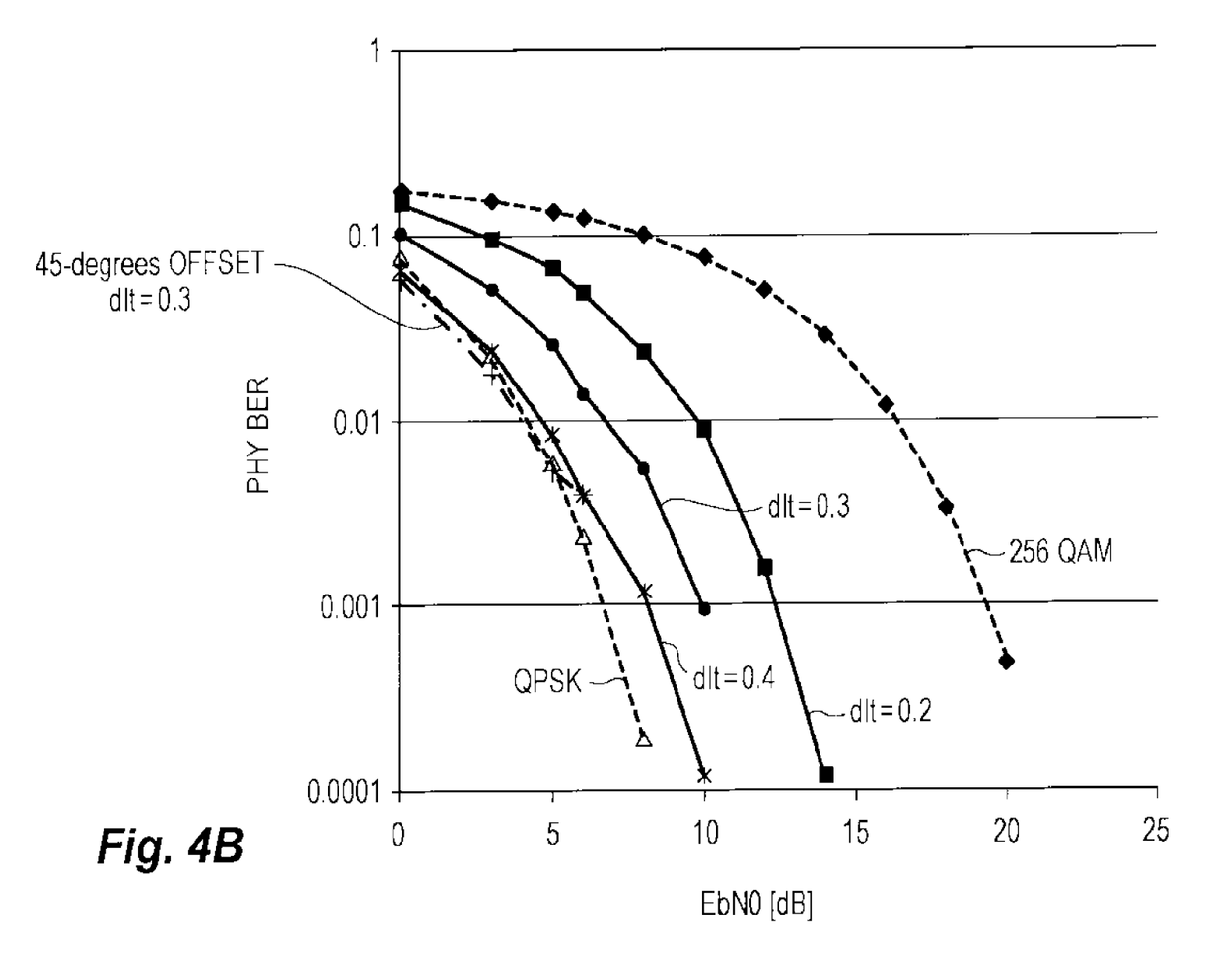
FIG. 4B is an exemplary graph of bit error rate of a physical layer, according to certain embodiments.

FIG. 4B is another exemplary graph of BER of a physical layer, according to certain embodiments. FIG. 4B also includes the theoretical values for QPSK and 256QAM systems as well as BER curves for the transmitter 100 and receiver 200 with a Walsh code of length $L_C$=4, four multiplexed layers, and dlt values of 0.2, 0.3, and 0.4. In addition, OFDM with 2048 subcarriers is assumed, and all subcarriers are QPSK modulated. FIG. 4B also includes an offset BER curve for an implementation where dlt is equal to 0.3, and an offset of 45 degrees is added to alternating layers, such as a second layer and a fourth layer, and the four layers are multiplexed together according to the processes described previously. The offset BER curve is approximately equal to the theoretical QPSK BER curve, but the amplitude of the offset multiplexed signal is a factor of 0.2 less than the amplitude of a multiplexed signal without an offset.

FIGS. 4A and 4B both illustrate that a communication capacity corresponding to the capacity of 256QAM can be fulfilled at $E_b/N_0$ values corresponding to $E_b/N_0$ of QPSK. For example, with 256 QM-OFDM, in order to achieve a PHY BER of $10^{-3}$ an environment $E_b/N_0$ is approximately equal to 18 dB. However, according to the embodiments described herein, a $10^{-3}$ BER can be achieved at an environment $E_b/N_0$ of approximately 7 dB. According to some implementations, urban environments have $E_b/N_0$ values of 10 to 15 dB, which means that 256QAM may not be able to be used. However, since the embodiments described herein ensure that transmission rates corresponding to 256QAM can be achieved while maintaining an $E_b/N_0$ of approximately 7 dB, frequency utilization efficiency may be quadrupled, and signals in the urban areas with $E_b/N_0$ values of 10 to 15 dB can be successfully transmitted.

In addition, the receiver 200 performs reverse spreading and subtraction of the multiplexed layers of the received signal, and interference between the layers is reduced based on the layered coefficient cg determinations described previously. Also, PSK modulation may be used for each of the layers higher than or equal to the second layer because the signal information may only be included in the phase. For example, QPSK corresponds to 4 PSK. By using phase-shift keying (PSK) for the second and higher layers, the multilevel modulation does not interfere with the first layer.

Employing PSK for one or more layers of the multiplexed signal allows a greater number of total symbols to be communication by one IFFT of the transmitter 100 and one FFT of the receiver 200. For example, in the case where M is equal to four layers, QPSK is applied to each of the second to fourth layers, and 16QAM is applied to the first level, resulting in 13 bits being transmitted per subcarrier, which corresponds to 8192QAM. The PHY BER associated with the multiplexed signal with 13 bits per subcarrier is greater than the PHY BER for QPSK, but is also less than the BER for QAM signals.

According to certain embodiments, multiplexing is performed simultaneously with increasing the amplitude of each of the signal layers, resulting in an increase of peak-to-average power ratio (PAPR). The increased PAPR of the multiplexed signal may make linearity of a transmission power amplifier (PA) in the transmitter 100 more significant. For example, when there is no offset for a single multiplexed signal with OFDM, the PAPR is 8.8 dB. For a case where four layers are multiplexed together according to the processes described herein, the PAPR is approximately 9.8 dB, resulting in a PAPR increase of 1 dB. The PAPR increase resulting from the four multiplexed layers may not cause a maximum transmission power to be exceeded for a base station transmitting a downlink (DL) signal, but terminal devices, such as cell phones or other mobile devices, may not be able to accommodate the increased PAPR. In some implementations, the issues caused by the PAPR increase at the terminal can be reduced by increasing a maximum transmit power at the terminal device, applying SC-OFDM, further applying distortion compensation, and the like.

According to certain embodiments where an uplink (UL) signal is transmitted from a terminal device to a base station, a plurality of terminal devices use the same subcarrier, which causes the transmitters on the terminal devices to control the transmit power so that the signals received at the base station maintain the relationships according to equation (8). By executing the processes described herein, the transmitter 100 on the terminal devices can decrease the total number of subcarriers when transmitting a multiplexed signal so that the terminal device may not need to perform power control operations. For example, in LTE, a minimum transmission size includes a group of 12 subcarriers per resource block (RB). When subcarrier modulation is performed by QPSK, 24 bits can be transmitted, and when subcarrier modulation is performed by 16QAM, 48 bits can be transmitted.

By contrast, according to the embodiments described herein, when four subcarriers are allocated to each terminal device and four iterations of the transmitter modulation process 120 are performed to multiplex four layers together using QPSK and 8 bits per subcarrier, 32 bits can be transmitted by the transmitter 100. Also, where the modulation scheme includes 16QAM for the first layer and 8 PSK for the second through fourth layers with 13 bits per subcarrier, 52 bits can be transmitted. In this example, three terminal devices can be allocated to one resource block, which triples the total capacity of the resource block because each terminal device is using just four subcarriers of the 12-subcarrier resource block. Therefore, reducing the subcarrier allocation for each terminal device by performing the layered multiplexing processes described herein, greater numbers of signals can be multiplexed and transmitted by the terminal devices without having to restrict transmission power.

According to the embodiments described herein, frequency utilization efficiency can be increased by sequentially multiplexing signals resulting from orthogonal multiplexing using an orthogonal code while simultaneously modifying the amplitudes of the signals. By performing the processes described herein, transmission rates corresponding to 256QAM can be achieved while maintaining PHY BER values corresponding to those of QPSK. Quadrupling the frequency utilization efficiency allows wireless communication systems to accommodate future growth in wireless communication traffic.

A hardware description of an exemplary device 500 for performing one or more of the embodiments described herein is described with reference to FIG. 5. For example, the hardware described by FIG. 5 can apply to a cellular base station and/or a terminal device, which can include any type of mobile device that communicates via at least one wireless network. When the device 500 is programmed to perform the processes related signal modulation and demodulation described herein, the device 500 becomes a special purpose device.

The device 500 includes a RF transceiver 526 that includes the components and circuitry of the transmitter 100 and receiver 200 described previously. The transceiver 526 can include a transmit antenna and a receive antenna, or the transmitter 100 and receiver 200 can share a common antenna with associated isolation components, such as a full duplexer. In other implementations, the device 500 can include just the transmitter 100 or just the receiver 200.

The device 500 includes a CPU 500 that perform the processes described herein. The process data and instructions may be stored in memory 502. These processes and instructions may also be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device 500 communicates, such as a terminal device and/or base station.

Further, the claimed advancements may be provided as a utility application, background daemon, or component of an operating system, or combination thereof, executing in conjunction with CPU 500 and an operating system such as Microsoft Windows, UNIX, Solaris, LINUX, Apple MAC-OS and other systems known to those skilled in the art.

CPU 500 may be a Xenon or Core processor from Intel of America or an Opteron processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

Figure 5:
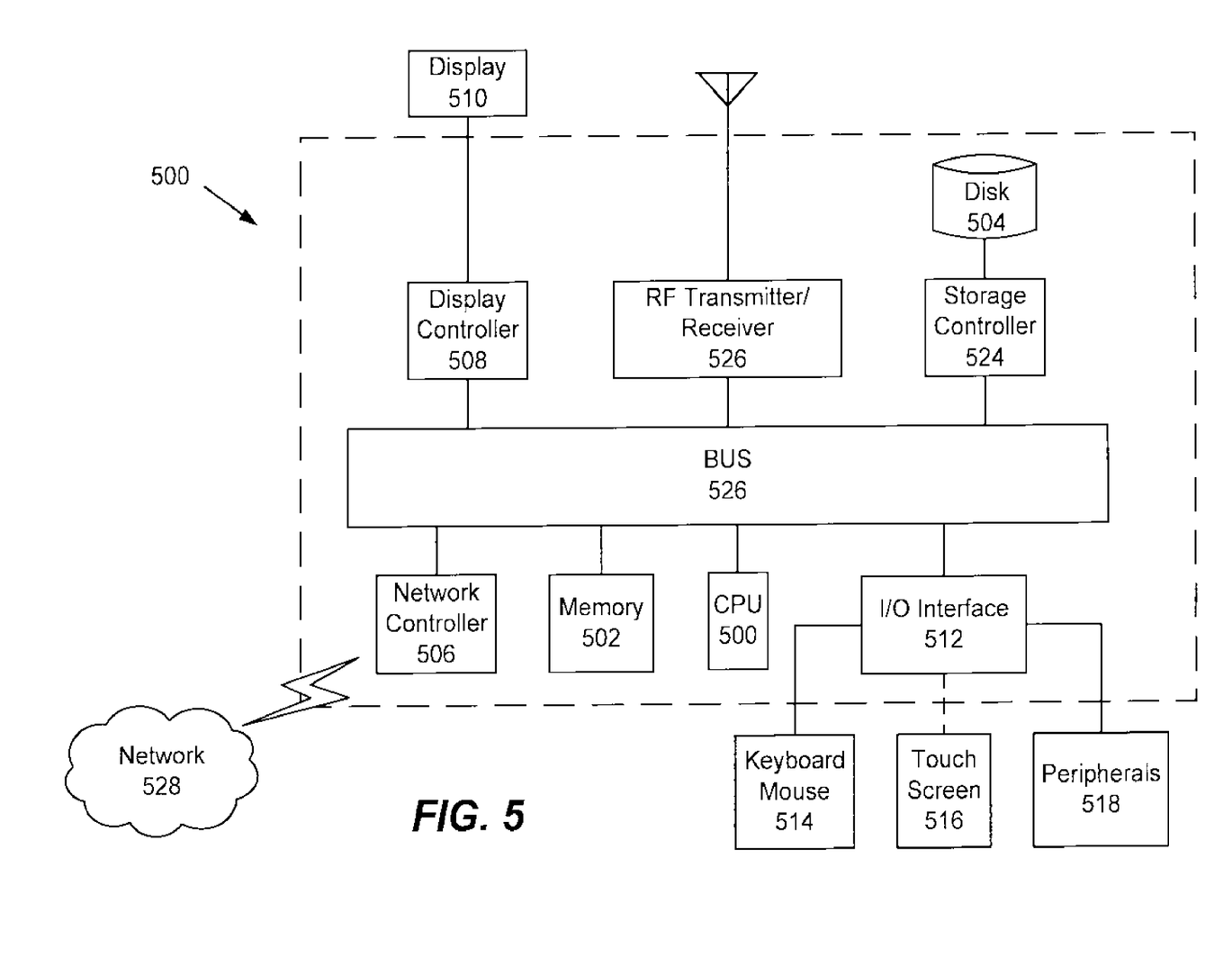
FIG. 5 is an exemplary block diagram of a device, according to certain embodiments.

The device 500 in FIG. 5 also includes a network controller 506, such as an Intel Ethernet PRO network interface card from Intel Corporation of America, for interfacing with network 528. As can be appreciated, the network 528 can be a public network, such as the Internet, or a private network such as an LAN or WAN network, or any combination thereof and can also include PSTN or ISDN sub-networks. The network 528 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The device 500 further includes a display controller 508 for interfacing with display 510 of the device 500, such as an LCD monitor. A general purpose I/O interface 512 at the device 500 interfaces with a keyboard and/or mouse 514 as well as a touch screen panel 516 on or separate from display 510. General purpose I/O interface 512 also connects to a variety of peripherals 518 including printers and scanners.

The general purpose storage controller 524 connects the storage medium disk 504 with communication bus 526, which may be an ISA, EISA, VESA, PCI, or similar, for interconnecting all of the components of the device 500. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 6.

Figure 6:
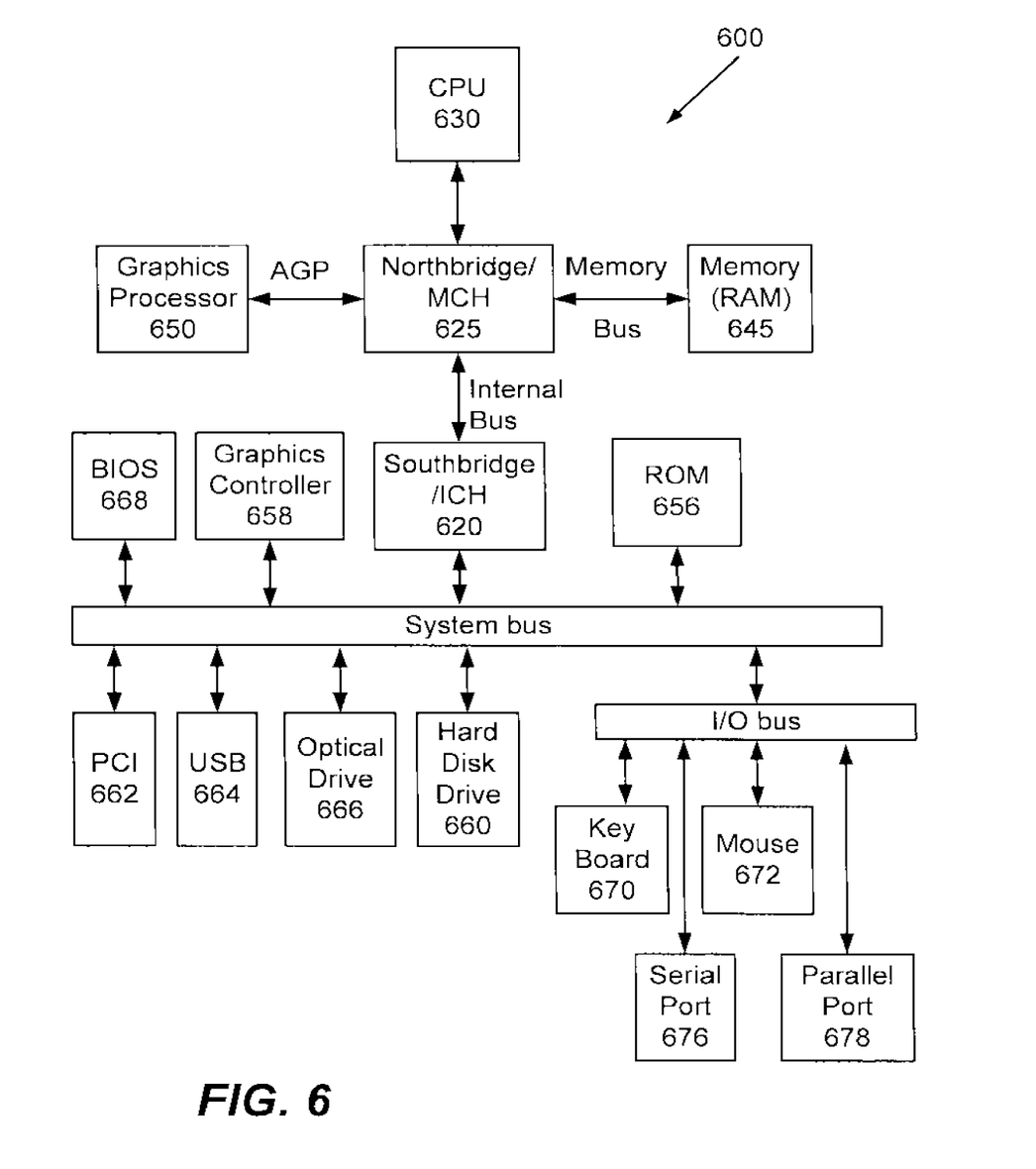
FIG. 6 is an exemplary schematic diagram of a data processing system, according to certain embodiments.

FIG. 6 shows a schematic diagram of a data processing system, according to certain embodiments, for performing the transmitter modulation process 120 and/or the receiver demodulation process 220. The data processing system is an example of a computer in which code or instructions implementing the processes of the illustrative embodiments may be located.

In FIG. 6, data processing system 600 employs a hub architecture including a north bridge and memory controller hub (NB/MCH) 625 and a south bridge and input/output (I/O) controller hub (SB/ICH) 620. The central processing unit (CPU) 630 is connected to NB/MCH 625. The NB/MCH 625 also connects to the memory 645 via a memory bus, and connects to the graphics processor 650 via an accelerated graphics port (AGP). The NB/MCH 625 also connects to the SB/ICH 620 via an internal bus (e.g., a unified media interface or a direct media interface). The CPU Processing unit 630 may contain one or more processors and even may be implemented using one or more heterogeneous processor systems.

Figure 7:
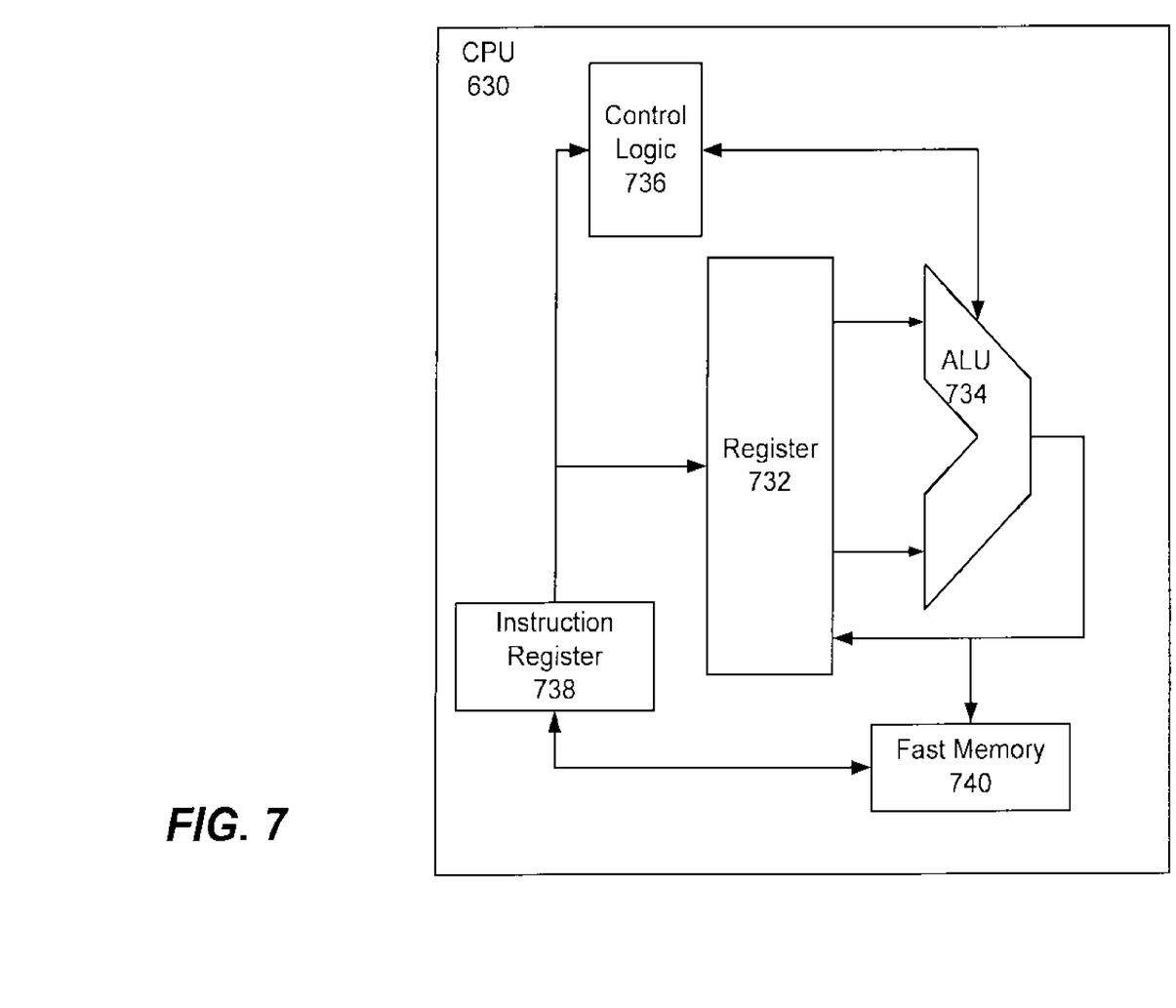
FIG. 7 is an exemplary schematic diagram of a processor, according to certain embodiments.

For example, FIG. 7 shows one implementation of CPU 630. In one implementation, the instruction register 738 retrieves instructions from the fast memory 740. At least part of these instructions are fetched from the instruction register 738 by the control logic 736 and interpreted according to the instruction set architecture of the CPU 630. Part of the instructions can also be directed to the register 732. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 734 that loads values from the register 732 and performs logical and mathematical operations on the loaded values according to the instructions. The results from these operations can be feedback into the register and/or stored in the fast memory 740. According to certain implementations, the instruction set architecture of the CPU 630 can use a reduced instruction set architecture, a complex instruction set architecture, a vector processor architecture, a very large instruction word architecture. Furthermore, the CPU 630 can be based on the Von Neuman model or the Harvard model. The CPU 630 can be a digital signal processor, an FPGA, an ASIC, a PLA, a PLD, or a CPLD. Further, the CPU 630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 6, the data processing system 600 can include that the SB/ICH 620 is coupled through a system bus to an I/O Bus, a read only memory (ROM) 656, universal serial bus (USB) port 664, a flash binary input/output system (BIOS) 668, and a graphics controller 658. PCI/PCIe devices can also be coupled to SB/ICH YYY through a PCI bus 662.

The PCI devices may include, for example, Ethernet adapters, add-in cards, and PC cards for notebook computers. The Hard disk drive 660 and CD-ROM 666 can use, for example, an integrated drive electronics (IDE) or serial advanced technology attachment (SATA) interface. In one implementation the I/O bus can include a super I/O (SIO) device.

Further, the hard disk drive (HDD) 660 and optical drive 666 can also be coupled to the SB/ICH 620 through a system bus. In one implementation, a keyboard 670, a mouse 672, a parallel port 678, and a serial port 676 can be connected to the system bust through the I/O bus. Other peripherals and devices that can be connected to the SB/ICH 620 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein. In other alternate embodiments, processing features according to the present disclosure may be implemented and commercialized as hardware, a software solution, or a combination thereof. Moreover, instructions corresponding to the transmitter modulation process 120 and/or receiver demodulation process 220 in accordance with the present disclosure could be stored in a thumb drive that hosts a secure process.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The above disclosure also encompasses the embodiments listed below.

(1) A device includes circuitry configured to spread one or more symbols with one or more orthogonal codes into spread signals having a predetermined number of bits, modify an amplitude of the spread signals via one or more layer coefficients, and multiplex the spread signals into a layered transmit signal.

(2) The device of (1), wherein the circuitry is further configured to allocate the layered transmit signal to a predetermined number of subcarriers.

(3) The device of (1) or (2), wherein the predetermined number of subcarriers corresponds to the predetermined number of bits of the spread signal.

(4) The device of any one of (1) to (3), wherein the one or more orthogonal codes are Walsh codes.

(5) The device of any one of (1) to (4), wherein the circuitry is further configured to determine the layer coefficients based on a coefficient difference factor that is less than one.

(6) The device of any one of (1) to (5), wherein the circuitry is further configured determine a highest layer coefficient to be greater than a sum of one or more remaining lower layer coefficients.

(7) The device of any one of (1) to (6), wherein the circuitry is further configured to reduce a physical layer bit error rate by increasing the coefficient difference factor.

(8) The device of any one of (1) to (7), wherein the circuitry is further configured to modify a total transmit power by modifying at least one of a sum of the layer coefficients or the predetermined number of bits of the spread signal.

(9) The device of any one of (1) to (8), wherein the circuitry is further configured to reduce a total transmit power for the layered transmit signal by adding an offset to at least one of the one or more layer coefficients.

(10) The device of any one of (1) to (9), wherein the circuitry is further configured to add the offset to alternating layers of the layered transmit signal.

(11) The device of any one of (1) to (10), wherein the offset is equal to 45 degrees.

(12) The device of any one of (1) to (11), wherein the layered transmit signal includes one or more non-orthogonal signal layers.

(13) The device of any one of (1) to (12), wherein the circuitry is further configured to reduce interference between the one or more non-orthogonal signal layers by modifying the amplitude of the spread signals with the one or more layer coefficients.

(14) The device of any one of (1) to (13), wherein the circuitry is further configured to implement quadrature amplitude modulation for a first layer and phase-shift keying modulation for second and higher layers of the layered transmit signal.

(15) The device of any one of (1) to (14), wherein the circuitry is further configured to allocate signals from one terminal device to four subcarriers of a twelve-subcarrier resource block.

(16) The device of any one of (1) to (15), wherein the circuitry is further configured to recover a highest received signal layers by reverse spreading a received signal with the one or more orthogonal codes.

(17) The device of any one of (1) to (16), wherein the circuitry is further configured to re-spread the highest received signal layer with the one or more orthogonal codes and multiply a corresponding spread signal by an associated layer coefficient.

(18) The device of any one of (1) to (17), wherein the circuitry is further configured to subtract a re-spread signal from the received signal to recover one or more lower received signal layers.

(19) A method including: spreading one or more symbols with one or more orthogonal codes into spread signals having a predetermined number of bits; modifying an amplitude of the spread signals via one or more layer coefficients; and multiplexing the spread signals into a layered transmit signal.

(20) A device including: circuitry configured to recover a highest received signal layer by reverse spreading a received signal with the one or more orthogonal codes, re-spread the highest received signal layer with one or more orthogonal codes and multiply a corresponding spread signal by an associated layer coefficient, and subtract a re-spread signal from the received signal to recover one or more lower received signal layers.

The invention claimed is:

1. A device comprising:
circuitry configured to
spread symbols into spread signals having a predetermined number of bits,
change an amplitude of the spread signals via layer coefficients, and
multiplex the amplitude modified spread signals into a layered transmit signal; and
a communication interface configured to transmit the layered transmit signal, wherein
the circuitry is configured to
determine a highest layer coefficient to be greater than a sum of a plurality of remaining lower layer coefficients.

2. The device of claim 1, wherein the circuitry is further configured to
determine the layer coefficients based on a coefficient difference factor that is less than one, and
allocate the layered transmit signal to a predetermined number of subcarriers.

3. The device of claim 2, wherein the predetermined number of subcarriers corresponds to the predetermined number of bits of the spread signal.

4. The device of claim 1, wherein the circuitry is further configured to reduce a physical layer bit error rate by increasing the coefficient difference factor.

5. The device of claim 1, wherein the circuitry is further configured to modify a total transmit power by modifying at least one of a sum of the layer coefficients or the predetermined number of bits of the spread signal.

6. The device of claim 1, wherein the circuitry is further configured to reduce a total transmit power for the layered transmit signal by adding an offset to at least one of the layer coefficients.

7. The device of claim 6, wherein the circuitry is further configured to add the offset to alternating layers of the layered transmit signal.

8. The device of claim 1, wherein the circuitry is further configured to reduce interference between the signal layers by modifying the amplitude of the spread signals with the layer coefficients.

9. The device of claim 1, wherein the circuitry is further configured to implement quadrature amplitude modulation for a first layer and phase-shift keying modulation for second and higher layers of the layered transmit signal.

10. The device of claim 1, wherein the circuitry is further configured to allocate signals from one terminal device to four subcarriers of a twelve-subcarrier resource block.

11. The device of claim 1, wherein the circuitry is further configured to recover a highest received signal layers by reverse spreading a received signal.

12. A device comprising:
circuitry configured to
spread symbols into spread signals having a predetermined number of bits,
change an amplitude of the spread signals via layer coefficients, and
multiplex the amplitude modified spread signals into a layered transmit signal; and
a communication interface configured to transmit the layered transmit signal, wherein
the circuitry is configured to
recover a highest received signal layer by reverse spreading a received signal, and
re-spread the highest received signal layer and multiply a corresponding spread signal by an associated layer coefficient.

13. The device of claim 12, wherein the circuitry is further configured to subtract a re-spread signal from the received signal to recover one or more lower received signal layers.

14. A method comprising:
spreading symbols into spread signals having a predetermined number of bits;
changing an amplitude of the spread signals via layer coefficients; and
multiplexing the amplitude modified spread signals into a layered transmit signal;
transmitting the layered transmit signal, wherein
a highest layer coefficient is determined to be greater than a sum of a plurality of remaining lower layer coefficients.

15. The method of claim 14, further comprising:
determining the layer coefficients based on a coefficient difference factor that is less than one, and
allocating the layered transmit signal to a predetermined number of subcarriers.

16. The method of claim 15, wherein the predetermined number of subcarriers corresponds to the predetermined number of bits of the spread signal.

17. The method of claim 14, further comprising:
reducing a physical layer bit error rate by increasing the coefficient difference factor.

18. The method of claim 14, further comprising:
modifying a total transmit power by modifying at least one of a sum of the layer coefficients or the predetermined number of bits of the spread signal.

19. The method of claim 14, further comprising:
reducing a total transmit power for the layered transmit signal by adding an offset to at least one of the layer coefficients.

20. The method of claim 19, further comprising:
adding the offset to alternating layers of the layered transmit signal.

* * * * *